April 29, 1930.  L. E. MITCHELL ET AL  1,756,065
DOG RACING APPARATUS
Filed Aug. 29, 1927  5 Sheets-Sheet 1
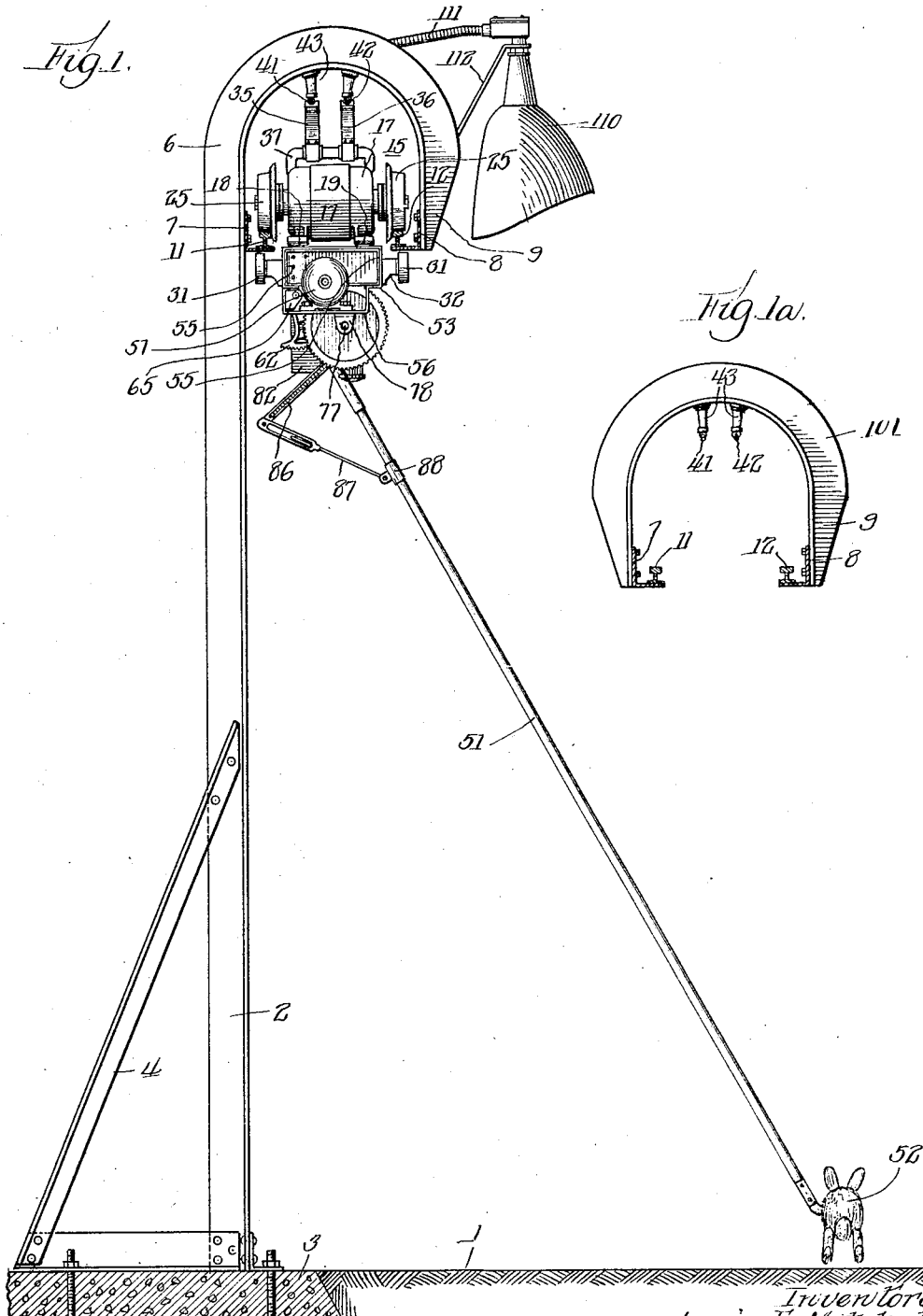

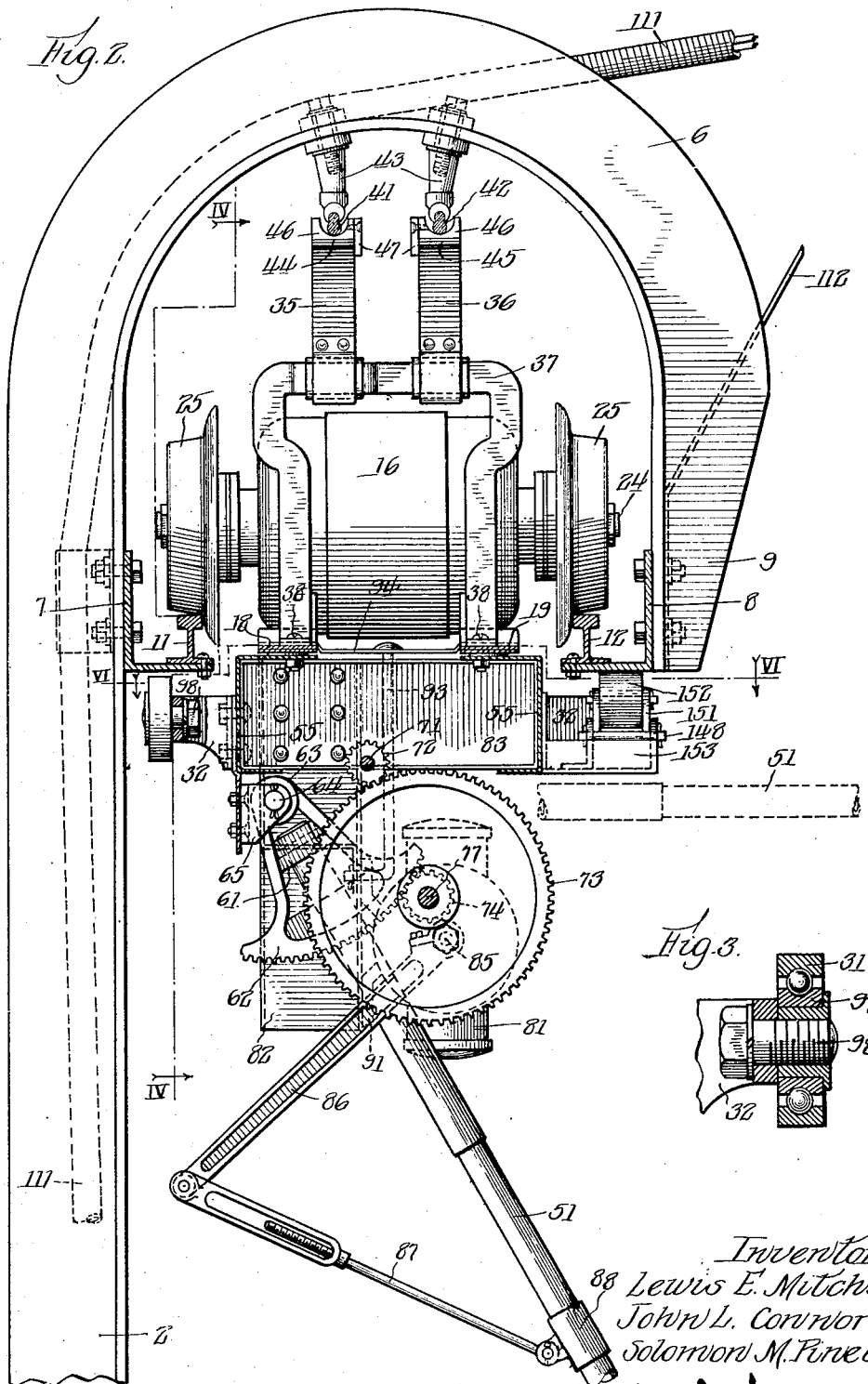

April 29, 1930.  L. E. MITCHELL ET AL  1,756,065
DOG RACING APPARATUS
Filed Aug. 29, 1927    5 Sheets-Sheet 3

Inventors
Lewis E. Mitchell,
John L. Connors,
Solomon M. Pineles,
By Cromwell, Greist & Warden
Attys

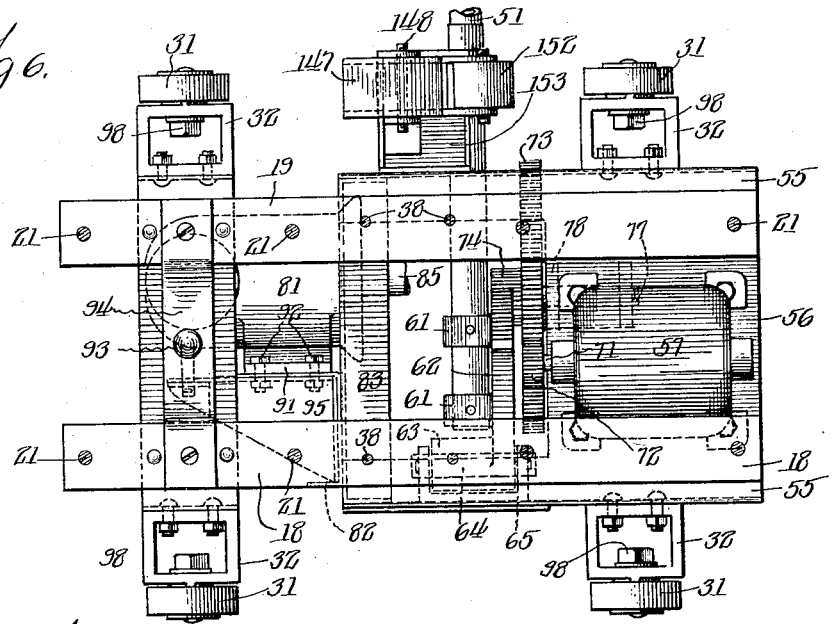

April 29, 1930.   L. E. MITCHELL ET AL   1,756,065
DOG RACING APPARATUS
Filed Aug. 29, 1927   5 Sheets-Sheet 5
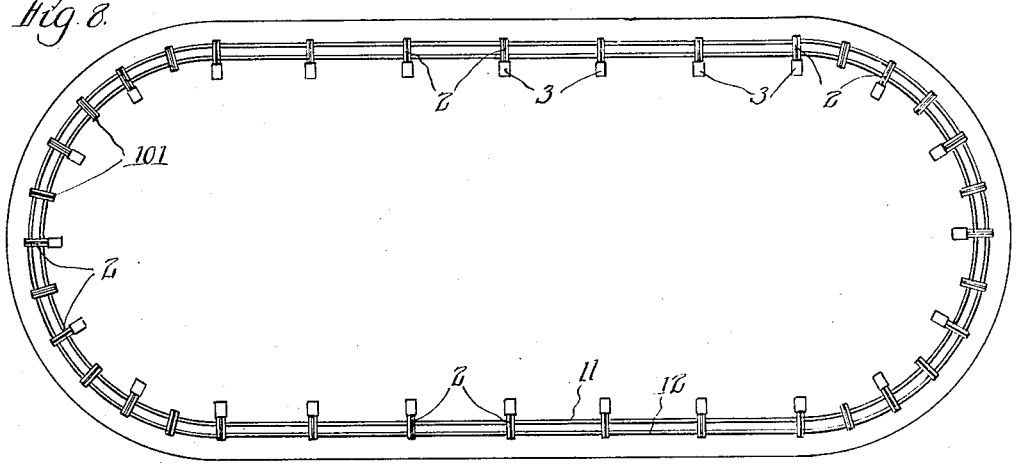
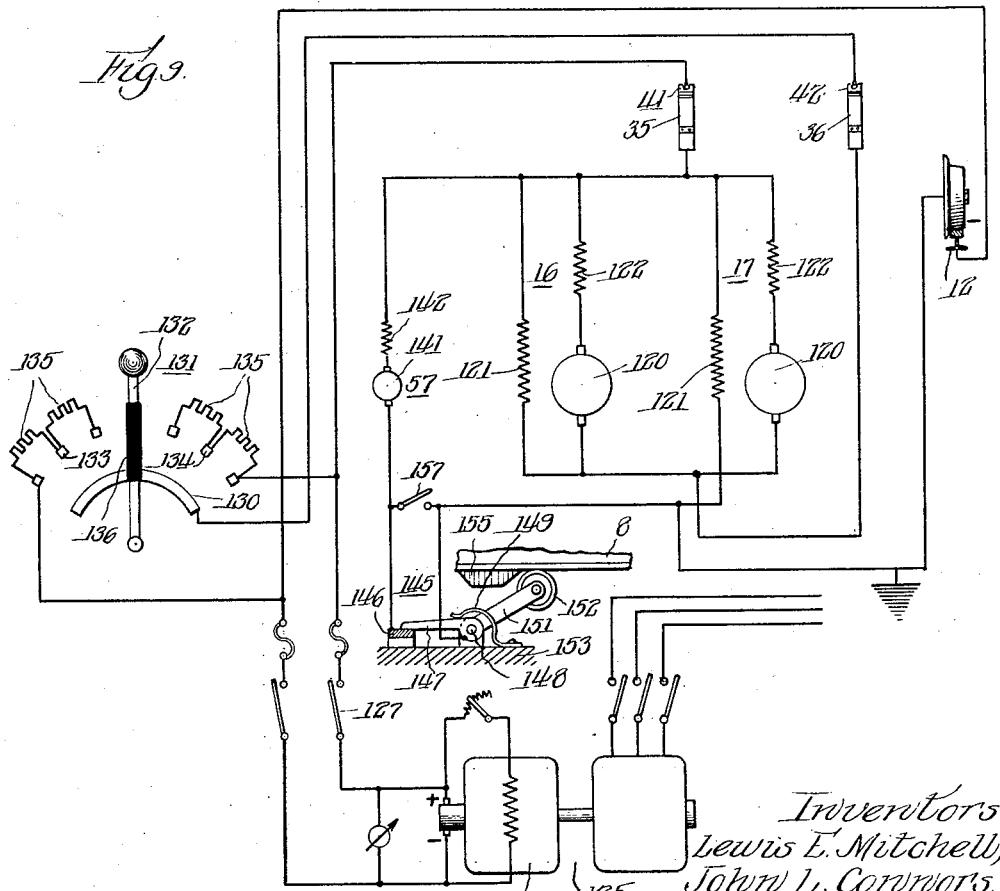
Inventors
Lewis E. Mitchell,
John L. Connors,
Solomon M. Pineles,
By Cromwell, Greist & Warden attys.

Patented Apr. 29, 1930

1,756,065

UNITED STATES PATENT OFFICE

LEWIS E. MITCHELL, JOHN L. CONNORS, AND SOLOMON M. PINELES, OF CHICAGO, ILLINOIS, ASSIGNORS TO HARRY B. STAVER, OF CHICAGO, ILLINOIS

DOG-RACING APPARATUS

Application filed August 29, 1927. Serial No. 216,246.

This invention relates to dog racing apparatus and it has among its objects the provision of an improved apparatus for carrying an artifical lure in front of the dogs along a race track and improved mechanisms for controlling the movement of the lure.

The objects of the invention will be best understood from the following description of exemplifications thereof, reference being had to the accompanying drawings, wherein Fig. 1 is a transverse sectional view of a race track illustrating the construction of the overhead lure track and the lure carriage supported in operative position on the track;

Fig. 1a is a transverse section through the overhead rail track with a view of the associated bracing arch taken at an intermediate point of a span between two posts;

Fig. 2 is a transverse sectional view through the lure carriage with the associated portions of the rail track structure along line II—II of Fig. 4;

Fig. 3 is a sectional view through the guide roller of the lure carriage;

Fig. 6 is a plan view of the frame structure of the lure carriage along the line VI—VI of Fig. 2;

Fig. 7 is a view similar to Fig. 2 showing the alignment of the carriage when passing over a curved portion of the track;

Fig. 8 is a plan view of the racing track;

Fig. 9 is a diagram of the connections of the motors and lure operating mechanism of the carriage and the associated power generating and controlling mechanisms.

Figure 4:
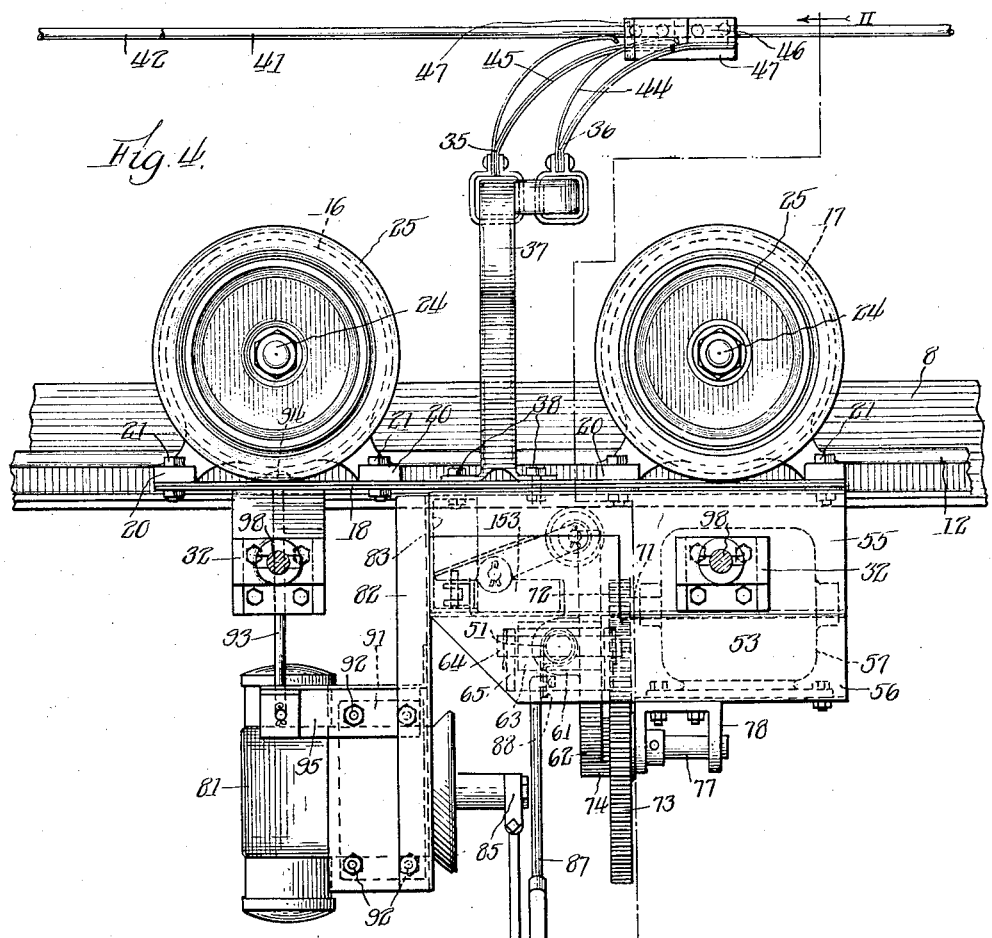
Fig. 4 is a side elevational view of the lure carriage and the associated rail structure taken along the line IV—IV in Fig. 2, the lure arm being in lifted position.

The lure drive according to the present invention distinguishes from those of the prior art in that it provides a simple and highly efficient driving carriage for the lure which, though of small size and light weight, is capable of operating at very high speeds of the order of fifty miles per hour and more. The improved lure carriage is provided with a very simple electrically operated mechanism for moving the lure from an operative to an inoperative position which is so arranged as to permit imitation of jumping movement over hurdles and the like. There is also provided an improved overhead rail track system for operating the carriage thereon which, with a minimum of material, secures support of utmost rigidity and stiffness for the rails upon which the lure carriage is to run.

Referring to the drawing, an oval racing track 1 as shown in Fig. 8 has disposed along the inner side thereof a series of posts 2, the posts being formed of T-shape angle iron secured to suitable foundation blocks 3, of concrete for instance, and stiffened by braces 4 against the foundation blocks. The upper end of each post is bent outwardly towards the track 1 and forms an arch 6. Extending between the posts within the inner space of the arches 6 are two girders 7 and 8 formed of angle iron, one girder 7 being suitably secured to the upper ends of the upstanding posts 2 and the other girder being secured to the bent-over portion 9 of the posts.

The angle irons 7 and 8 thus define an oval runway along the track and on the horizontal portions of said angle irons there are supported two rails 11 and 12, the rails being suitably secured to the angle irons as by means of bolts or welding. A rail track is thus obtained comprising two spaced rails supported on an overhead structure with a free space between the rails.

A carriage is arranged to run on this rail track, the truck of the carriage consisting merely of two driving motors 16 and 17 and a pair of straps 18, 19, to which the two motors are secured. The motors are of the ordinary commercial form having each a familiar frame with four legs 20 at the base thereof. These legs are suitably connected, as by means of bolts 21, to the straps 18 and 19. The straps are made of an elastic material such as tempered steel in order to permit play between the motor in the front portion and the motor in the rear portion and adjustment of the individual wheels to the track while tending to maintain all four wheels on the track and avoiding slippage of one or the other wheel. The motor frames with the straps 18, 19, running therebetween thus constitute a very simple truck frame without requiring any complicated structures, full use being made of the frame of the motors.

Figure 5:
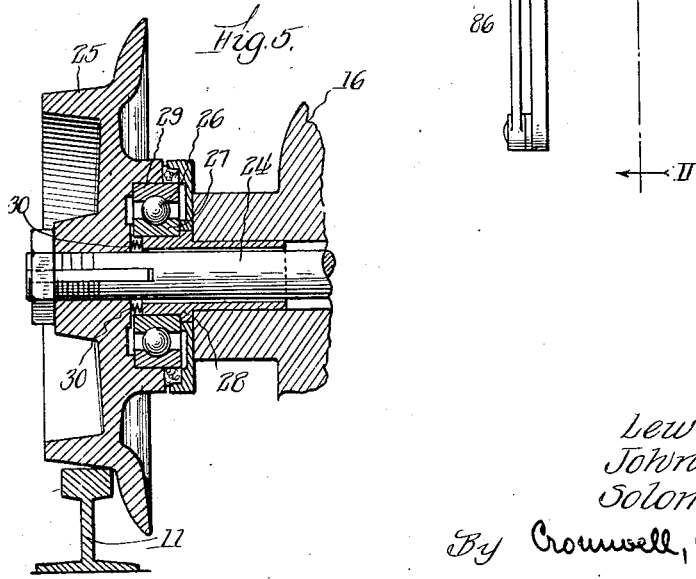
Fig. 5 is a sectional view of a carriage supporting and driving wheel.

Each of the motors 16, 17 has directly mounted on the shaft stubs 24 extending on both sides thereof flanged wheels 25 adapted to engage the rails 11 and 12 to run thereon and be guided thereby along the track. The shafts 24 with the associated wheels 25 are mounted on ball bearings 26 as illustrated in Fig. 5, the inner race 27 of the ball bearings being held on a sleeve member 28 which is secured to the frame of the motor 6 in place of the ordinary sleeve bearing, the outer race 29 of the bearing being secured to the hub of the wheel 25. Spring washers 30 between the end of the sleeve 28 and the adjacent portion of the wheel 25 serve to establish a good conducting connection to the wheels so as to provide a connection between some of the terminals of the motor and the rails which are used as one of the supply lines, as will be more fully described hereinafter.

Through utilization of a carriage of such simple structure as described above, which consists essentially only of the two motors and a very light but firm frame connection therebetween, it is possible to secure high operating speed with relatively small motors. Thus, a speed of fifty to sixty miles is being obtained with the motors having each a rating of only three-quarters of a horsepower. In order to hold the carriage on the track and prevent jumping on account of its light weight and high operating speed, the carriage is provided with a plurality of guide rollers 31 supported on suitable brackets 32 extending from underneath the side straps 18 and 19, the rollers underlying the rails 11 and 12 and the angle irons 7 and 8 so as to oppose upward movement of the carriage in a direction away from the track. Either one or two pairs of rollers may be provided, but in the preferred construction two pairs of rollers are used disposed underneath the two pairs of wheels 25 of the front motor 16 and the rear motor 17.

In addition to the electric supply current connection through the grounded rails 11, 12 and the wheels 25 of the carriage there are provided two additional supply connections in the form of a pair of collector forks 35, 36, that are insulatingly supported side by side on an arched bracket 37 that is mounted on the two side straps 18, 19 by means of bolts 38. The collector members 35 and 36 are arranged to cooperate with the trolley conductors 41, 42 that are insulatingly mounted on suitable insulators 43 that are secured to the upper portion of the arches 6, the conductors running along the track so as to supply current to the collector members 35 and 36. The collector members 35 and 36 are each formed of a plurality of leaves of resilient conducting material, such as phosphor bronze, each member comprising two groups of leaf springs 44, 45 that are somewhat spaced from each other, so that if one of said groups of springs should jump off the trolley conductor, the other one will still be making contact. This is important in view of the high operating speed and the tendency of the collector members 35, 36 to be thrown out of contact with the conductors. The rearward leaf spring member 45 carries at its end a fork-shaped member 46 embracing the supply conductor from underneath so as to hold the collector member in proper alignment with the conducting member. In order to prevent accidental contact between the leaf spring members 44 and 45 of the two collector members 35 and 36, the fork members 46 have mounted on the opposing sides thereof insulating plates 47. In addition, the two collector members 35 and 36 are longitudinally offset with respect to each other in order to further exclude any possibility of accidental contact therebetween.

Suspended from the carriage truck in the space between the two rails 11 and 12 there is a lure mechanism including a lure arm 51 carrying a lure 52 at its lower end thereof and a lure supporting structure 53 described hereinafter in detail. The lure supporting structure comprises two U-shaped strips 55 secured longitudinally underneath the straps 18 and 19. On a cross piece 56 mounted between the two opposite strips 55 there is secured a rotary torque motor 57 which serves to hold the lure arm 51 in operative position near the ground. The upper end of the lure arm 21 is held upon laterally extending brackets 61 of a gear segment 62 that has a hub member 63 which is journaled on a pivot 64 that is supported on a bracket 65 extending from one of the U-shaped strips 55. The torque motor 57 is similar in construction to an ordinary electric motor, and when energized it will rotate its shaft 71 like an ordinary electric motor.

On the shaft 71 of this torque motor there is mounted a pinion 72 which drives a gear wheel 73 that, in turn, is coupled to another pinion 74 which engages the teeth of the rack segment 62. The gear wheel 73 with the pinion 74 that is coupled thereto is supported on the frame by means of a shaft 77 which is journaled on a bracket 78 that is secured to the cross member 56 underneath the torque motor 57.

There is also provided a spring mechanism in the form of a door-check 81 which is supported on a bracket 82 extending from a cross tie member 83 between the two strips 55, the cross tie member 83 being also of U-shape and serving to stiffen the supporting structure of the lure mechanism. The door-check 81 has a rotary actuating shaft 85 on which is mounted an actuating arm 86 to the end of which is pivotally secured a rod 87 which is, in turn, pivotally connected to a clamp 88 on the lure arm 51. The length of the rod 87 is adjustable, it being composed of a portion having a threaded end fitting into another portion into which it may be screwed to a greater or smaller extent.

The door-check 81 is so arranged that the spring element thereof tends to rotate the arm 86 in a direction at which the lure arm 51 will be lifted from the ground so as to bring the lure 52 into inoperative position, as shown in Fig. 4 and by dotted lines 51' in Fig. 2. Accordingly, when the torque motor 57 is de-energized, the arm 86, when looked at in the views of Figs. 1 and 2, will be rotated in counter-clockwise direction transmitting its movement to the rod 87 which, acting through the clamp 88, will rotate the lure arm 51 around its pivotal connection at 64 until the lure arm 51 is in substantially horizontal position, indicated by the dotted line 51', Fig. 2. During this movement the segment 62 will be rotating the pinion 74, the gear 73, and therethrough the pinion 72 of the de-energized torque motor 57. The torque motor, in turn, is so arranged that when energized it will rotate the pinion 72 and therethrough the gear wheel 73, the pinion 74 and gear segment 62, so as to counteract the spring element of the door-check 81 and bring the lure arm 51 to its downward operative position, as shown in Fig. 1 wherein the lure 52 is held near the ground.

The door-check 81 is mounted on the structure by clamping the supporting bracket 91 of the door-check to the downwardly extending bracket 82 by means of bolts 92, a strut rod 93 extending between a cross piece 94 on the two straps 18 and 19 and an extending portion 94 of the bracket serving to additionally stiffen the several members against each other.

The entire lure supporting and operating mechanism is built as a unit so as to prevent disengagement of the pinions and gears on account of jolts during the travel at high speed over any uneven portion of the track. Instead of making the frame of the supporting structure of structural sheet metal, the same result may be obtained by making the frame in the form of a casting or in any other suitable manner provided that care is taken that the several operative elements thereof shall maintain positive engagement during the travel of the carriage.

The mounting of the rollers 31 is shown in detail in Fig. 3. Each of the rollers is formed of an outer race of a ball bearing, the inner race 97 of which is clamped to the bracket 32 by means of a bolt 98.

In order to hold the sections of the girders 7 and 8 and the associated rails at the proper spacing throughout the length of the spans between the posts, bracing arches 101, as shown in Fig. 1a, are provided. The arches resemble the arches 6 at the upper ends of the posts 2. Between the two lower ends of the arches are mounted the girders 7 and 8 with the associated rails 11, 12, and on the top portion of the arches there are mounted the insulators 43 which support the trolley conductors 41, 42.

On the curved portions of the track the outer rail 12 is supported at a higher level than the inner rail 11 to form a banked rail track, as shown in Fig. 7, in order to reduce the lateral strain imposed by the carriage by reason of the centrifugal forces. The individual posts 2 may also be used for supporting reflectors 110, there being provided conduits 111 running along the posts and extending beyond the upper portions thereof, the ends of the conduits with the reflectors 110 being supported on suitable braces 112 that are anchored on the arches.

The electric driving mechanism and the power supply connections therefor are shown in the circuit diagram of Fig. 9. The two motors 16 and 17 are of the direct-current type, each comprising an armature 120, a shunt field winding 121 and a series winding 122. The armatures 120 of the two motors with the associated series winding 122 are connected in parallel between the two collector members 35, 36. The two shunt windings 121 are also connected in parallel, one terminal of the two windings being connected to the collector member 35 and the other terminal being grounded thereby establishing a connection to the grounded rails 11, 12 which serve as one supply line. The operating current for the two motors is obtained from any suitable direct current source, for instance, a small motor generator set 125 including a direct current generator 126, the two terminals thereof, indicated by the plus (+) and minus (−) signs, being connected through a main switch 127 to the trolley conductor 41, which is engaged by the collector member 35 that leads from one set of the armature and field terminals to the grounded rail 12 from which connection is obtained to the other set of terminals of the field winding 121.

The trolley conductor 42 which is engaged by the collector member 36 that leads from the other of the two parallel connected armatures 120 is connected to a contact strip 130 of a controller 131 by means of which the armatures may be connected either to the other negative pole of the supply or to the trolley conductor 41, thus providing a short circuit across the two armatures for dynamic braking. The controller 131 has a controller handle 132 and two sets of contact members 133, 134 for controlling the running speed as well as the dynamic braking action. The contact members 133, 134 are bridged by suitable control resistors 135, the extreme left of the contact members 133 being connected to the negative terminal of the supply source and the extreme right of the contact members 134 being connected to the trolley conductor 41. The handle 132 has a conducting bridging member 136 for establishing conducting connections between the conducting strip 130 and the individual contact members 133 as the handle is being moved from its central neutral position to the left or to the right.

To operate the carriage the switch 127 is closed thereby energizing the shunt field windings 121 of the motors. If the carriage is to be propelled, the control handle 132 is moved from its neutral position, shown in the drawing, towards the left, establishing a conducting connection between the strip 130 and the contact members 133, at first including the resistors 135 and then, in the course of the movement of the controller handle to the left, gradually cutting out said resistors until direct connection is established in the last step. In these positions of the controller handle a circuit is established from the negative terminal of the supply source through the contact members 133, the contact member 136, strip 130, trolley line conductor 42, contact member 36, through the two parallel connected armatures 120 and series windings 122 to the other contact member 35, the second trolley conductor, back to the positive terminal of the supply source. Current will thus flow through the armatures as well as through the field windings causing the two motors to drive the carriage.

To stop the carriage, dynamic braking action is applied by moving the controller handle 132 toward the right so as to bring the contact member 136 in engagement with the contact members 134, gradually cutting out the resistors 135 and increasing the braking action as the handle is moved to the extreme right contact member. In these positions of the controller handle 132 the braking circuit of the armature leads from the contact strip 130 to the trolley conductor 42, contact member 36, through the two parallel connected armatures 120 and field windings 121, to the other contact member 135, trolley conductor 41, contact members 130, contact member 136, back to the contact strip 130, thus providing a closed circuit for the current flow including more or less of the resistors 135 depending on the position of the handle 132. Since the shunt field windings 121 are at the same time energized through the closed switch 137, the rotating carriage will induce in the armatures 120 current flowing by way of the closed circuit traced above, this generating action causing the carriage to stop.

The lure propelling torque motor 57 referred to above comprises an armature 141 with a series winding 142 that are connected in parallel to the two windings 121 between the contact member 35 and the rail conductor, although, if desired, the torque motor could be connected between the contact member 35 and the contact member 36. Included in the energizing circuit of the torque motor 57 there is a lure control switch 145 comprising a stationary contact member 146 and a movable contact member 147 pivotally mounted at 148 and provided with a spring 149 tending to maintain the two contact members 146 and 147 in engagement.

The contact member 147 has connected thereto an arm 151 having at its end a cam roller 152 which is so arranged that by pressing down on said cam roller, the arm 151 is turned thereby swinging open the contact member 147 and interrupting the circuit connection with the stationary contact member 146. The switch 145 is so mounted on a suitable bracket 153 extending from the carriage that the roller 152 moves in the path of a cam 155 supported longitudinally underneath the girder 8 on the outer side of the rail track at a point where it is desired that the lure arm shall be lifted, for instance, to imitate the jumping of a rabbit over a hurdle, or in order to permanently hold the lure arm in elevated position independently of the energization of the driving motors. There is also provided a second switch 157 in parallel with the lure lifting switch 145 serving to short circuit the lure lifting switch if its action is to be cut out.

Assuming at first that the switch 157 is closed and the action of the lure lifting switch 145 cut out, then the lure lifting torque motor 57 will be energized each time the shunt windings 121 are energized. Accordingly, as soon as the switch 127 is closed, the lure arm 51 will be moved downwardly through the action of the torque motor. The lure arm will be held in this downward position until the circuit connection which supplies the two shunt windings 121 is interrupted, that is, until the switch 127 is opened.

If it is desired to cause the lure arm to be lifted over certain portions of the track, for instance, over a portion where a hurdle is to be placed, and the lure is to imitate the jumping movement of a rabbit, the switch 157 is opened and the lure lifting switch 145 is brought into action. As long as the switch 145 is left in closed position and the main control switch 127 is closed, the lure motor 57 will be energized and will hold the lure in downward position. However, when the cam roller 152 on the arm 151 of the switch 145 comes into engagement with the cam 155, the energizing circuit of the torque motor 57 is interrupted causing the spring mechanism in the door-check 81 to lift the lure arm in the manner described above. This upward motion of the lure arm will last as long as the switch 145 is open, and if the switch remains in this state, for a sufficient length of time, the lure arm will finally reach its substantially horizontal inoperative position. However, when hurdle jumping is to be imitated, the cam 155 extends only over a short length of the track and its length is so chosen as to release the cam roller 152 as soon as the hurdle has been cleared by the uplifted lure arm. With the cam roller 152 now released the switch 145 returns to its closed position again energizing the lure lifting motor 57 and causing the lure arm to return to its downward position.

The principles and ideas underlying the various features described and illustrated hereinabove are susceptible of embodiment in variety of other structures that will suggest themselves to those skilled in the art. It is, accordingly, desired that the appended claims be given a broad construction commensurate with the scope of the invention.

We claim:

1. In an animal racing course in which dogs are induced to run behind a lure propelled along said course, a lure carriage, electric current supply connections for said carriage, a rotary motor on said carriage, a lure arranged to be moved by said motor between an operative and inoperative position, an energizing circuit for said motor, a switch on said carriage for controlling said energizing circuit, and a cam along said course for operating said control switch to cause said lure to move between the operative and inoperative positions.

2. In an animal racing course in which dogs are induced to run behind a lure propelled along said course, a lure carriage, a lure arm supported on said carriage, an electric motor for moving said lure arm between an operative and inoperative position, an energizing circuit for said motor, a control switch on said carriage for said energizing circuit, and means on said course for operating said control switch.

3. In an animal racing course in which dogs are induced to run behind a lure propelled along said course, a lure carriage, a laterally projecting lure arm pivotally supported on said carriage for swinging movement in a vertical plane, an electric motor for swinging the lure arm in one direction, an energizing circuit for the motor, and spring means for swinging the lure arm in the opposite direction when the circuit for the motor is de-energized.

4. In an animal racing course in which dogs are induced to run behind a lure propelled along said course, a lure carriage, a laterally projecting lure arm pivotally supported on said carriage for swinging movement in a vertical plane, an electric motor for swinging the lure arm from a raised position to a lowered position, an energizing circuit for the motor, and spring means for swinging the lure arm from a lowered position to a raised position when the circuit for the motor is de-energized.

In testimony whereof we have hereunto subscribed our names.

LEWIS E. MITCHELL.
JOHN L. CONNORS.
SOLOMON M. PINELES.